July 26, 1938.  T. DE PORT  2,124,547
RECORDING INSTRUMENT
Filed Oct. 28, 1930    4 Sheets-Sheet 3
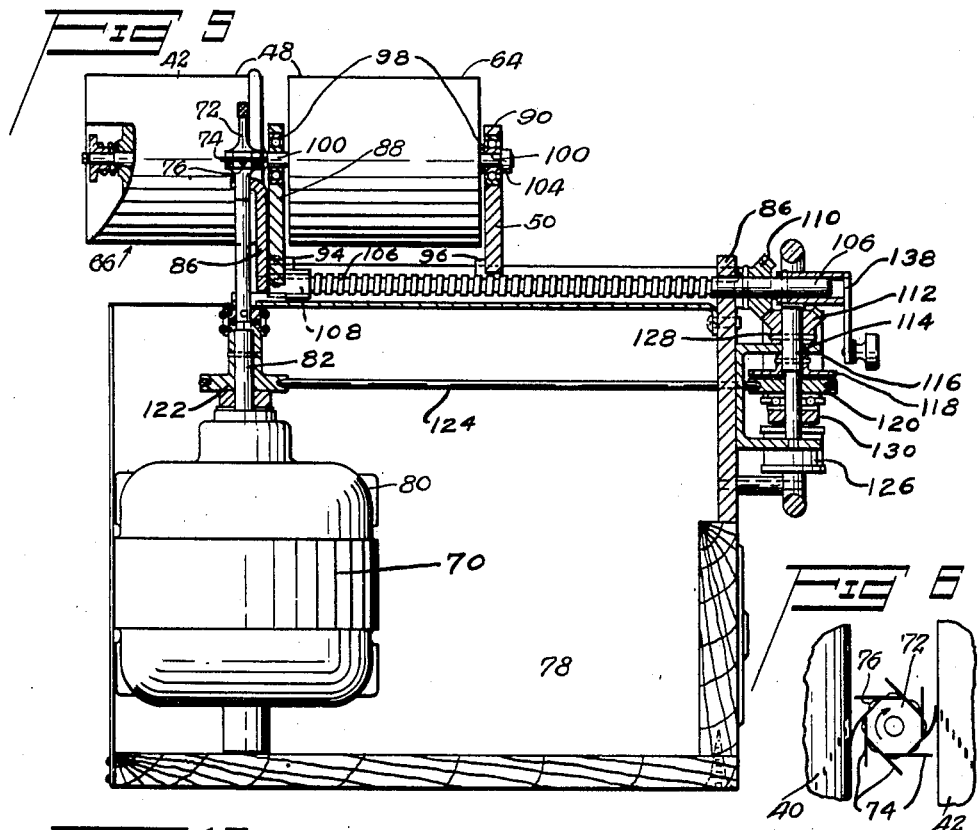
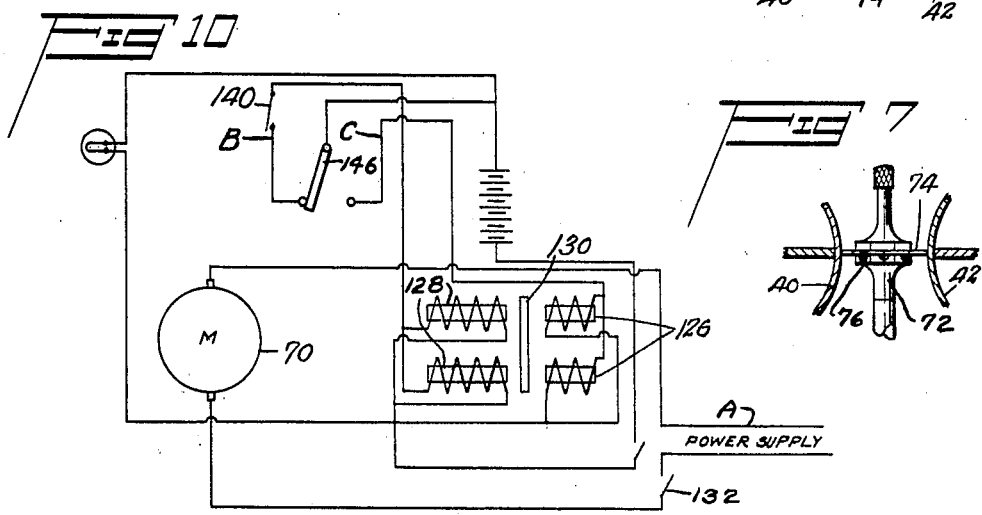
INVENTOR
THEOPHILE DE PORT
BY Robert H. Greig
ATTORNEY July 26, 1938.  T. DE PORT  2,124,547
RECORDING INSTRUMENT
Filed Oct. 28, 1930  4 Sheets-Sheet 4
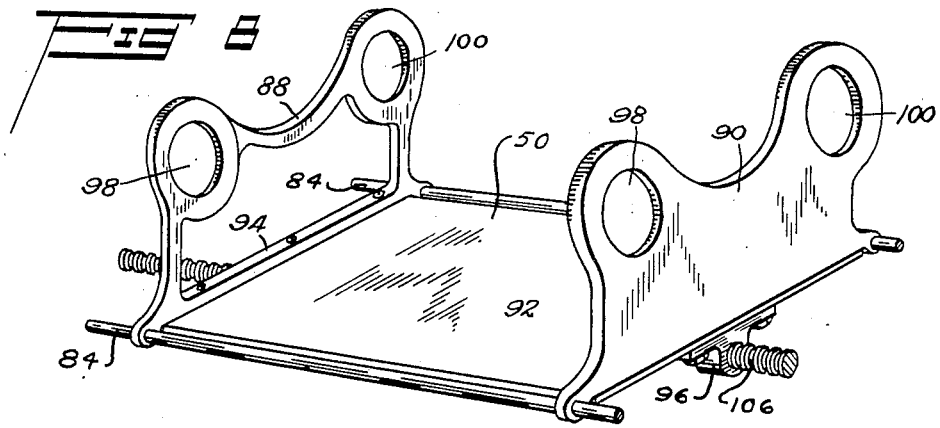
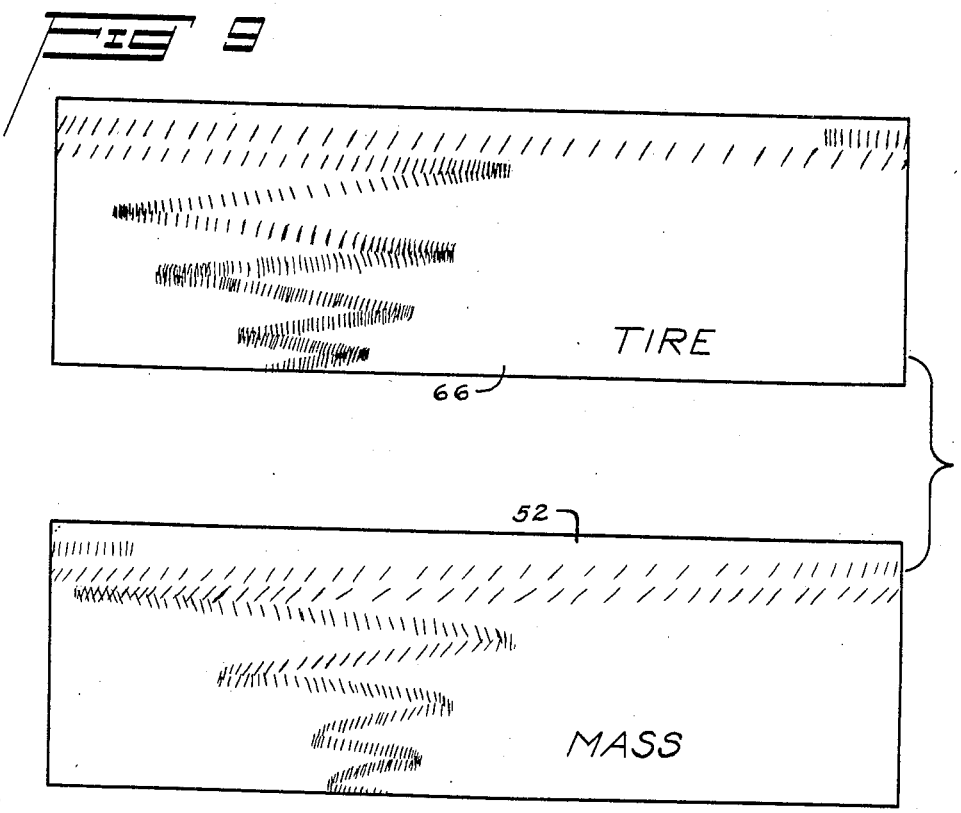
INVENTOR
THEOPHILE DE PORT
BY Robert H. Young
ATTORNEY Patented July 26, 1938

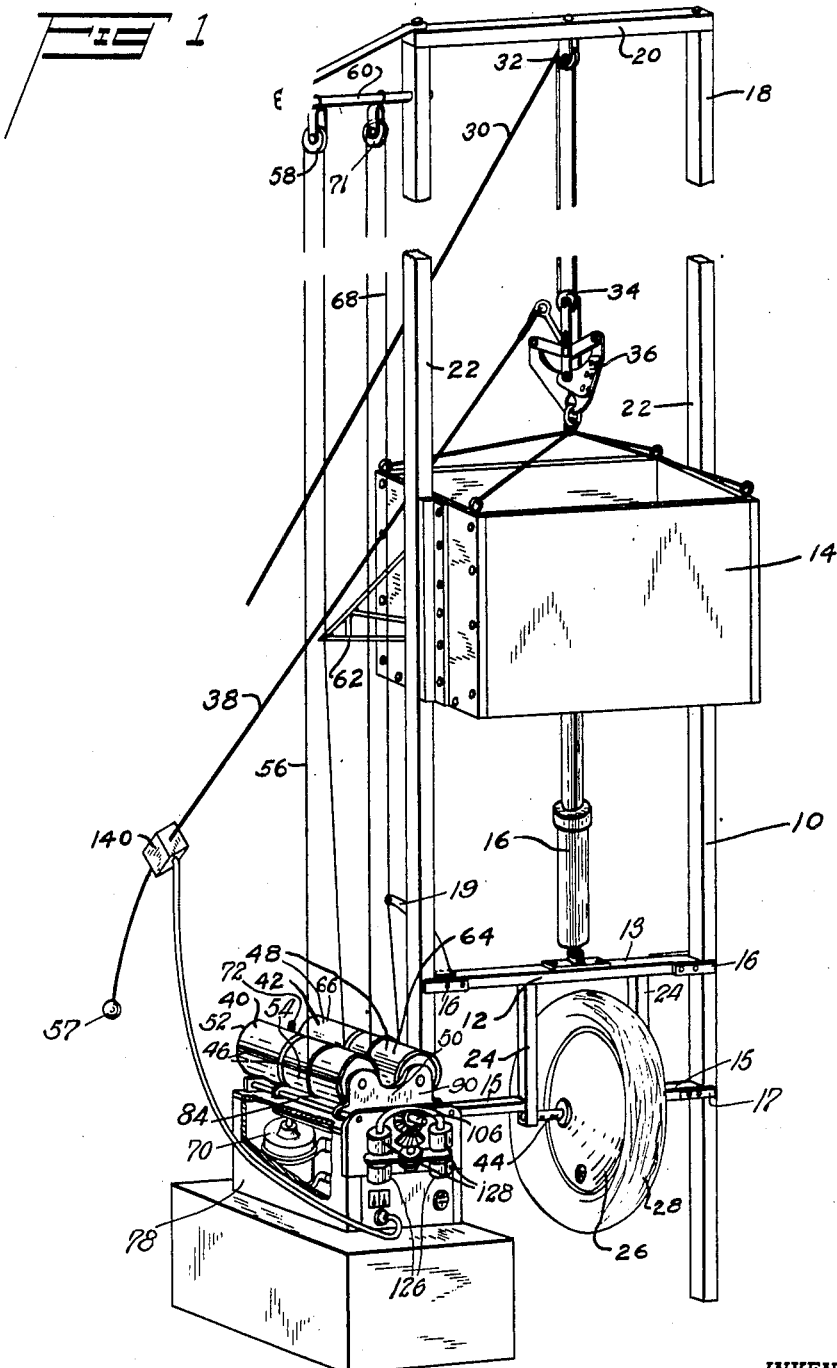

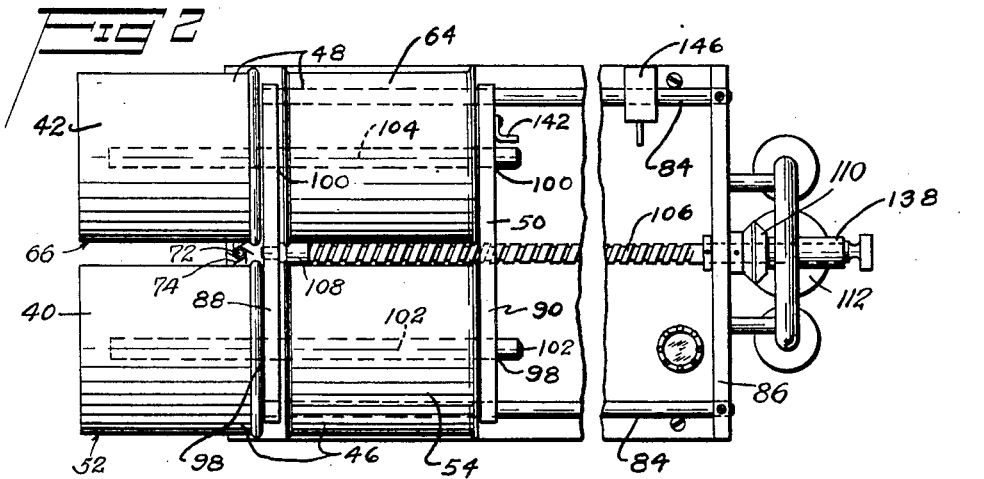
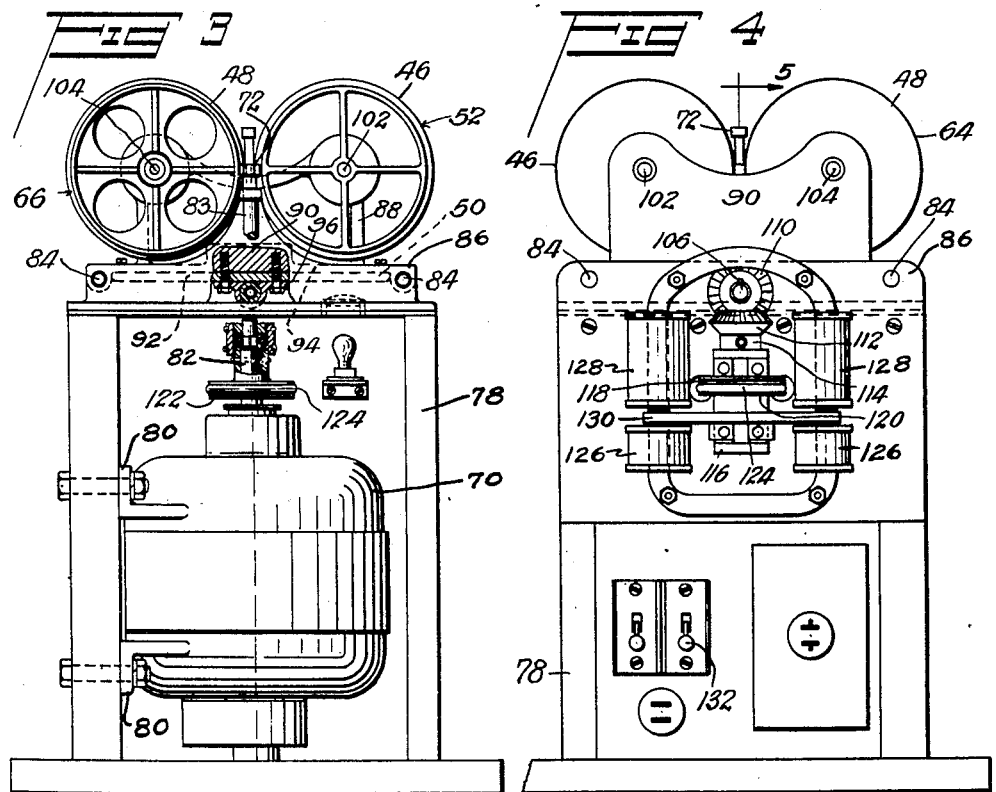

2,124,547

UNITED STATES PATENT OFFICE 2,124,547

RECORDING INSTRUMENT

Theophile de Port, Dayton, Ohio

Application October 28, 1930, Serial No. 491,721

14 Claims. (Cl. 234—65)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to instruments for recording the instantaneous successive positions of two relatively movable members of a machine at predetermined intervals, or two or more relatively movable specimens of a system. Thus for example the successive relative deflections of the wheel tire and body of a vehicle, or a mass equivalent thereof may be recorded, from which records the oscillations and deflections of a shock absorber interposed between the wheel and mass of the vehicle may be readily determined and the relative velocities and accelerations computed.

The object of the invention is to provide an improved apparatus which is readily and easily applied, which is reasonably cheap to manufacture and is simple in its details so that it is not likely to get out of order. The apparatus has primarily been developed for the testing of airplane landing gear or their component members under dynamic conditions or under impact loads. It is not, however, intended to restrict my invention to the testing of airplane landing gear, but the same might be used in connection with other devices for determining the independent movements of two members relative to a common reference.

The main object of my invention is to simultaneously record the instantaneous deflections of two relatively movable members under impact and obtain synchronized records of the instantaneous deflections thereof. In accordance with my invention a record is obtained for the deflections of each member, and on separate cards or recording surfaces, successive deflections at predetermined intervals being indicated by the spacings between markings or traces of the record, and corresponding traces on the records indicating the corresponding positions of the wheel and mass at the instant said traces are recorded.

My invention consists in providing a recording means having two independently operable cards or recording surfaces, each of which is adapted to be attached to its corresponding specimen to be tested in such a manner as to have imparted thereto the movements of said specimens relative to a common reference, anti-frictionally suspending said specimens and arranging the other part of the recording means, such as the markers, whereby when the specimens are released from their suspended position the cards will be moved relative to each other and simultaneously past the markers, whereby the instantaneous deflections of said specimens under impact load are recorded.

The invention also consists in an improved instrument, of exhibiting the instantaneous deflections of two relatively moving members or specimens and at the same time also causing the oscillations of said specimens to be recorded by providing a plurality of markers and permitting the cards to move simultaneously past said markers in the direction at right angles to the path of the specimens.

This invention also consists in a device for recording the instantaneous deflections at relatively short intervals of two relatively movable members, comprising a plurality of relatively movable record surface or card supports adapted to be supported by a carriage for simultaneous movements, a clock mechanism such as a 60-cycle synchronous motor to which is operatively connected a plurality of pencils, stylets, markers, or other writing or recording implements, which are so arranged with respect to the recording surface supports that when said supports are operated by the specimens or by the relatively moving members, as above stated, the pencils, stylets, or the like will be operated by the clock mechanism and will record a plurality of deflections of each specimen on its corresponding recording surface for every cycle of said motor.

The invention furthermore consists in the improvements in the parts and devices and the novel combinations of the parts and devices herein shown, described, or claimed.

In the drawings forming a part of this specification:

Fig. 1 is a perspective view of the jig supporting in an elevated position a landing gear system to be subjected to test and showing my recording device in connection therewith;

Fig. 2 is a top plan view of the recording device shown in Fig. 1;

Fig. 3 is an end view of Fig. 2 looking from left to right with parts in section and broken away;

Fig. 4 is an end view looking from right to left of Fig. 2;

Fig. 5 is a sectional view taken on the line 5—5 of Fig. 4;

Fig. 6 is a detail plan view of the marking element showing fractional portions of the recording surfaces;

Fig. 7 is an end elevational view of Fig. 6;

Fig. 8 is a perspective view of the carriage for the record and driving drum sets;

Fig. 9 shows the cards removed from the record drums with markings thereon; and

Fig. 10 is a diagram of the electric circuit of the recording device.

Referring first to the structure illustrated in Fig. 1, 10 denotes a jig, which consists of a wheel frame 12 adapted to receive wheels of various sizes and a weight box 14 of 5,000 pounds capacity or more connected to said wheel frame by means of a shock absorber 16 to permit relative vertical movements of said wheel frame and box with respect to a common reference, and a framework 18 provided with a cross brace 20 to support the box and wheel frame in suspended position and with suitable heavy side guides 22 to guide said box and frame in their vertical movements, ball bearings (not shown) being provided between the guides and the frame and box to avoid drag in their vertical movements.

The wheel frame 12 is constructed in the form of a fork which consists of a cross-bar 13 and two leg portions 24, each leg portion having attached thereto and at the lower end thereof a cross-bar 15 for bracing the same. The cross-bars 13 and 15 are provided at their outer ends with guide plates 16 and 17, respectively, for slidable engagement with the side guides 22, and a wheel 26 having a tire 28 disposed between the legs 24 and mounted on an axle 44 that is connected at its opposite ends to the lower ends of the legs 24.

Interposed between and connected to the wheel frame 12 and the box 14 is the shock absorber 16 to be tested. It will, of course, be understood that any one or all of the relatively movable members may be the subject of test. The box, shock absorber, and wheel, which constitute the landing gear system, are elevated as a unit by means of a hoist, as a cable 30 which runs over suitable pulleys 32 and 34 connected to the cross brace 20 and box 14 respectively. When the unit has been lifted the required predetermined distance, the same is released by means of a suitable releasing mechanism such as a trip shackle 36 which interconnects the pulley 34 and the box 14 and is manually operated by an extension cord 38. In this manner impact loads induced by the free drop of the box, shock absorber and wheel are imparted to the shock absorber and tire. The relative positions or deflections of the wheel axle and the box with respect to each other and a common point of reference are recorded on two separate recording surfaces or cards, as shown in Fig. 9, in a manner hereinafter specifically described.

As illustrated in Figs. 1 and 2 of the drawings, a recorder device is operatively connected to the system for obtaining synchronized records of the successive positions of the weight box, referred to hereinafter as mass deflections, and the wheel axle 44, referred to hereinafter as tire deflections, whereby the magnitudes of instantaneous mass and tire deflections occurring between relatively small intervals of time may be determined. This recording device comprises two sets of drums 46 and 48 arranged in spaced relation and supported by a carriage 50 that is movably mounted on a support 78 in proximity to the jig. Each set consists of a record surface supporting drum and a driving drum that are fixedly mounted on a common shaft and are capable of freely rotating about a horizontal axis.

In set 46 the drum 40 serves as a support for the mass deflection card 52 and the driving drum 54 has wound thereon a wire or cord 56 (or other flexible but inextensible means) that also passes around a pulley 58, suspended from a bracket 60 fixed to the framework 18, to form an endless belt that is connected to the weight box 14 by means of a mast 62. It will thus be evident that since the free rotation of the drums 40 and 54 is controlled and restrained by the deflections of the weight box, the rotational movements imparted to the card supporting drum 40 will correspond with the vertical movements of the weight box.

Similarly the driving drum 64 of the set 48, in which the drum 42 serves as a support for the tire deflection card 66, has wound thereon a wire or cord 68, which passes around a pulley 71, also suspended from the bracket 60 to form an endless belt which is attached to the wheel axle 44, through the frame 12 and mast 19, whereby rotational movements corresponding to the vertical movements of the wheel axle will be imparted to the drum. The driving elements of the drum sets are of such dimensions that the marks recorded, as hereinafter described, on the recording surfaces, indicate the proper mass and tire deflections. Obviously by suitably proportioning the diameters of the corresponding supporting and driving drums any desired ratio of magnification may be obtained within practical limits.

In view of the fact that the relative mass and tire deflections which occur when the system is released, take place in a very small fraction of a second the number of successive deflections recorded on each recording surface will depend upon the interval between markings or traces. Obviously if the interval between markings is relatively short, then the number of markings will be large and vice versa. It is highly desirable, and from a practical point of view imperative in impact testing that the number of markings recorded per second be relatively large in order that the results of the readings of the mass and tire deflection records can be made sufficiently precise for obtaining accurate velocities and accelerations of the masses. By increasing the number of markings per second the accuracy is improved. To this end appropriate clock mechanism of any suitable type, such as a synchronous alternating-current motor 70 may be provided, through the agency of which a rotating element 72, having a plurality of markers 74, which, for purposes of illustration and as shown in Figs. 6 and 7 are eight in number, are rotated at a constant speed. For example, by the use of such a motor rotating at 30 revolutions per second, the number of markings per second will be the product of the number of revolutions per second and the number of markers when the rotating element is in direct drive with the motor.

The markers are made alike, and of spring metal, each having one end free and the other end fixed by any suitable means, such as screws 76, to the multi-faced element 72 that is arranged between the drums 40 and 42 and is rotatable about an axis at right angles to the axis of rotation of said drums. These markers are disposed in the same plane and equidistant from each other, having their free ends extending rearward with respect to the axis of rotation of the element 72, as shown by the arrow in Fig. 6. Each pair is so arranged that each marker is diametrically opposed to the other for simultaneously contacting with drums 40 and 42.

The synchronous alterating-current motor is housed within and fixedly connected to the support 78 by means of brackets 80 rigid with the motor and bolted to a side of the support. The motor is positioned so that its rotating shaft 82 projects vertically and upwardly with its axis lying in a plane substantially midway between the drums 40 and 42. To this shaft the element 72 is fixedly connected for rotating about an axis coincident with the axis of said shaft.

In accordance with the illustration of the use to which my invention is applied as herein described, means is provided for obtaining a relative movement of the marker supporting element 72 and record supporting drums 40 and 42 in a plane at right angles to the plane of the path of the landing gear system in order that as the masses are deflected under impact, thereby effecting oscillatory movements of the record drums, overlapping of the markings or traces on each record will be prevented. The means for effecting this relative bodily movement of the marker supporting element and the record drums consists of the carriage 50 slidably movable on a pair of parallelly spaced rods 84 that are rigidly connected to the support 78, and gearing interconnecting the motor 70 and carriage 50. This carriage is of simple construction and consists of a pair of upright supports 88 and 90 that are held in spaced relation by means of a horizontally disposed plate 92 bolted to inwardly presenting flanges 94 and 96 of the supports 88 and 90 respectively. Each of the supports is provided with a pair of journals 98 and 100 for rotatably mounting the drum shafts 102 and 104 thereon, the driving drums being disposed between the supports 88 and 90, and the record drums being spaced from the driving drums and rearward of the support 88.

Any suitable means may be provided for advancing the carriage 50 past the marker elements, and as shown in Fig. 5 consists of a worm 106 and pinion 108, the worm being rotatably journaled in the brackets 86, the pinion being fixed to the carriage and in mesh with the worm. One end of the worm projects outwardly rearward of bracket 86 and has fixed thereon a bevel gear 110, which in turn is in mesh with a bevel gear 112 disposed below and at right angles to the gear 110. Bevel gear 112 is fixedly connected to the upper end of a shaft 114 that passes through and is journaled to the upper leg of a U-shaped bracket 116.

The lower end of the shaft 114 is journaled on the lower leg of the bracket 116 and is provided in immediate of its ends with a disk plate 118 that is fixed to the shaft and constitutes one element of a plate clutch. A pulley 120, the upper face of which cooperates with the disk plate 118 for effecting a clutching action, is freely rotatable thereon and movable along its longitudinal axis. Rotational movement is imparted to the pulley 120 by means of the motor 70 that is provided with a pulley 122 on its shaft 82 and an endless belt 124 passing around both of these pulleys. Vertical movement of the pulley 120 effects a clutching action, and through the gearing described, causes the carriage to advance past the recording elements. This vertical movement is accomplished by two sets of electromagnets 126 and 128, that energize a metallic bar 130 to move the same up or down and thereby slide the pulley 120, which is supported on the bar, in clutching or declutching engagement with the disk 118 respectively.

The operation of the device described is as follows:

In using the apparatus, the timing device, that is, the synchronous motor 70 in this instance, for rotating the marker elements is actuated by closing the circuit A controlled by a switch 132. The smoked cards 52 and 66 respectively are placed on the drums 40 and 42 respectively and their carriage is moved to the left, Fig. 2, by means of a crank handle 138 on the outwardly projecting end of worm 106. After the landing gear system has been lifted by means of the hoist a predetermined distance, it is released by manually giving the cord handle 57 a quick jerk. A trip switch 140 forms part of the extension cord and serves to complete the electrical circuit B for energizing the electro-magnets 128. It is thus possible to simultaneously release the system and energize the electro-magnets 128 which results in a clutching engagement of the pulley 120 and disk plate 118, thus moving the carriage with its record drums in a path at right angles to the path of the system. As the record drums move past the markers, markings or traces at predetermined intervals are successively recorded on the smoked cards. When the carriage has moved past the markers a predetermined distance, the trip switch arm 142, shown in Fig. 2, will operate switch 146, breaking circuit B and closing circuit C, thus energizing the electromagnets 126 for declutching the pulley 120 from the disk plate 118 and thus bringing the carriage to a quick stop. Since the rotational velocity of these drums is dependent upon the respective velocities of the mass and wheel to which they are connected, the space between markings on cards and any common reference point thereon will correspond to and indicate the relative positions of said mass and wheel at any instant with respect to the common reference point. It will, of course, be seen, when comparing the markings of the mass-deflection card corresponding with the markings of the tire-deflection card, that there is a difference in the spaces between them. These differences represent the deflections of the shock absorber and the curve of the shock absorber deflection can be plotted.

The mass time-deflection curve is obtained directly from the record. In general, it is not necessary to plot all the points before contact of tire with ground. It is sufficient to plot about 10 intervals before the contact. All points are plotted after the contact up to the first rebound. This curve may show slight oscillations, depending on the type of shock absorber caused by the impact wave propagation. These oscillations can be faired out without introducing error in the final results.

It will of course be understood that the constructional details may be widely varied depending upon circumstances of usage without any change in the basic idea of the invention.

Having now particularly described and ascertained the nature of my said invention and in what manner the same is to be performed, I declare that what I claim is:

1. An apparatus for obtaining a record of the relative positions of a plurality of non-synchronously movable parts of a mechanism comprising, in combination, mark-receiving surfaces connected to said parts respectively to respond to the movements thereof, and marking means arranged in operative relation to said surfaces for marking said surfaces simultaneously and periodically during the movements of said parts.

2. In a recording instrument, the combination with a movable mark-receiving surface, of means arranged in operative relation to said surface for periodically marking said surface, said means comprising a constant speed rotating member and a yieldable marking element carried by and rotatable with said member in a circular path lying in a plane substantially normal to said surface for periodically marking said surface and thereby obtain time-space markings thereon.

3. In a recording instrument, the combination with a movable mark-receiving surface, of means arranged in operative relation to said surface for periodically marking the same, said means comprising a constant speed rotating member and a plurality of flexible marking elements carried by and rotatable with said member in a circular path lying in a plane substantially normal to said surface, said elements being arranged in predetermined spaced relation and extending tangentially from the periphery of said member, for periodically marking the said surface and thereby obtain time-space markings thereon.

4. Apparatus for obtaining a record of the movements of a plurality of associated devices that are relatively gravity actuated comprising, a corresponding plurality of associated mark-receiving members, each operatively responsive to the movement of the corresponding device and means for periodically marking each of said members and in timed relation to one another.

5. Apparatus for obtaining a record of the movements of a plurality of associated devices that are relatively actuated in non-synchronous relation comprising, a corresponding plurality of associated mark-receiving members each driven by one of the devices and automatic means for automatically intermittently marking said members and in pre-determined timed relation to one another.

6. Apparatus for obtaining a record of the movements of a plurality of associated devices that are relatively actuated comprising a corresponding plurality of associated mark-receiving members each driven by one of the devices, means for intermittently marking said members in timed relation to one another, and means for simultaneously actuating said members in a direction different from the direction of the first-mentioned movement of said members.

7. Apparatus for obtaining a record of the movements of a plurality of associated devices that are relatively movable comprising, in combination, means for elevating and supporting said devices, means for releasing said devices to be gravity actuated when in the elevated position, a corresponding plurality of associated mark-receiving members each rotatably driven by one of the devices, means for simultaneously linearly actuating said members, means for simultaneously initiating the release of said devices and the linear movement of said mark receiving members and means for intermittently marking each of said members in timed relation to one another.

8. In a recording device, a plurality of associated mark-receiving members each freely rotatively mounted and adapted to be driven independently of one another in non-synchronous relation and means for automatically intermittently marking said members in pre-determined timed relation to one another.

9. In a recording device a plurality of associated mark-receiving members each freely rotatively mounted and adapted to be driven independently of one another in non-synchronous relation and a single means for automatically periodically marking said members in pre-determined timed relation to one another.

10. In a recording device, a plurality of associated mark-receiving members each freely rotatively mounted and adapted to be driven independently of one another, means for intermittently marking said members in timed relation to one another, and means for simultaneously, linearly actuating said mark-receiving members for obtaining a sinuous line of markings on said mark-receiving members.

11. In a recording device, a plurality of associated mark-receiving members each freely rotatively mounted and adapted to be driven independently of one another with respect to time, means for intermittently marking said members in timed relation to one another, and means operatively connected with said last mentioned means for simultaneously, linearly actuating said mark-receiving members for obtaining a sinuous line of markings on said mark-receiving member.

12. A time recording device adapted for use with a mark-receiving surface, comprising a constant speed rotatable supporting member and a plurality of flexible marking elements having one end fixed to said support and the other end free and trailing behind said fixed end during rotation of said support, said marking elements being so constructed and arranged as to produce interrupted markings in predetermined relation on said surface by a wiping contact there-between during rotation of said support.

13. In a system for obtaining a time interval record of the relative positions of a plurality of members that are relatively non-synchronously movable with respect to a common point of reference, a corresponding plurality of movable recording surfaces respectively actuated by said members, means for causing said members to be simultaneously actuated, and means for simultaneously marking said surfaces at predetermined intervals during the movement thereof whereby the extent of the individual movements of said members relative to said common point of reference during each interval is recorded.

14. Apparatus for obtaining a record of the movements of a plurality of associated devices that are relatively non-synchronously actuated comprising a corresponding plurality of associated members each driven by one of the devices and means for simultaneously recording the movements of said members periodically and at predetermined constant intervals of time.

THEOPHILE DE PORT.